(12) United States Patent
Colinet

(10) Patent No.: US 6,530,831 B1
(45) Date of Patent: Mar. 11, 2003

(54) VENTILATING, HEATING AND AIR-CONDITIONING DEVICE FOR MOTOR VEHICLE PASSENGER COMPARTMENT

(75) Inventor: Andre Colinet, Puteaux (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/601,348

(22) PCT Filed: Feb. 19, 1999

(86) PCT No.: PCT/FR99/00373

§ 371 (c)(1),
(2), (4) Date: Oct. 11, 2000

(87) PCT Pub. No.: WO99/42314

PCT Pub. Date:Aug. 26, 1999

(30) Foreign Application Priority Data

Feb. 20, 1998 (FR) .......................................... 98 02068

(51) Int. Cl.[7] ............................................... B60H 1/06
(52) U.S. Cl. ...................... 454/121; 454/137; 454/144; 454/156
(58) Field of Search ........................... 454/84, 99, 100, 454/121, 124, 137, 144, 156

(56) References Cited

U.S. PATENT DOCUMENTS

| 2,115,472 A | * | 4/1938 | Sargent |
| 2,696,774 A | | 12/1954 | Bayley |
| 3,343,473 A | * | 9/1967 | Gillick et al. |
| 4,022,599 A | * | 5/1977 | Wilson |
| 4,874,036 A | * | 10/1989 | Masuda |
| 5,307,645 A | * | 5/1994 | Pannell .................... 454/144 X |
| 5,308,279 A | * | 5/1994 | Grinberg ................. 454/144 X |
| 6,206,092 B1 | * | 3/2001 | Beck et al. .................. 454/156 |

FOREIGN PATENT DOCUMENTS

| AU | 173008 A | * | 11/1952 | ................. 454/121 |
| DE | 975 044 A | * | 7/1961 | ................. 454/121 |
| EP | 0 210 548 | | 2/1987 | |
| EP | 0 503 987 | | 9/1992 | |
| EP | 0 673 796 | | 9/1995 | |
| FR | 2 659 908 | | 9/1991 | |
| FR | 2 717 747 | | 9/1995 | |
| FR | 2 744 978 | | 8/1997 | |
| JP | 1-223014 A | * | 9/1989 | ................. 454/137 |

* cited by examiner

Primary Examiner—Harold Joyce
(74) Attorney, Agent, or Firm—Oblon, Spivak, McClelland, Maier & Neustadt, P.C.

(57) ABSTRACT

A ventilating, heating, and air conditioning device for a motor vehicle passenger compartment which includes air intake orifices and an associated air intake conduit which supplies at least one fan which forces an intake air stream through two heat exchangers towards a distributor. Outlets are connected by discharge pipes to associated orifices distributed inside the passenger compartment. The fan, heat exchanger, and distributor are controlled to selectively diffuse air streams inside the passenger compartment with variable flow rate and temperature. The distributor is transversely arranged in a central position and longitudinally behind a row of seats, and the distributor outlets are at the vehicle floor level.

15 Claims, 4 Drawing Sheets

VENTILATING, HEATING AND AIR-CONDITIONING DEVICE FOR MOTOR VEHICLE PASSENGER COMPARTMENT

BACKGROUND OF THE INVENTION

1. Field of the Invention

The invention relates to a device for ventilating, heating and air-conditioning a passenger compartment of a motor vehicle.

The invention relates more particularly to a device for ventilating, heating and air-conditioning a passenger compartment of a motor vehicle, of the type provided with inside and outside air intake orifices for the passenger compartment of the vehicle and at least one air intake conduit associated with the said orifices, which conduit supplies at least one main fan, which forces an intake air stream through at least one heat exchanger toward a distributor, whose outlets are connected by ducts to associated vents, distributed throughout the passenger compartment, for delivery of air, and of the type provided with means for actuation of the main fan, exchanger and distributor, which means make it possible to blow delivery air streams of variable flowrate and temperature selectively into the zones of the passenger compartment.

2. Description of the Background

There are known numerous devices for ventilating, heating and air-conditioning designed to blow air streams at diverse temperatures and in diverse zones of the passenger compartment of a motor vehicle.

Most such devices are disposed between the dashboard and the engine compartment of the vehicle, and are provided with a fan which draws air either from outside or from inside the vehicle, then directs it to a heating radiator which uses the cooling fluid of the internal combustion engine, or to a cooling exchanger. The air heated or cooled in this way is then directed by the distributor and a system of ducts to diverse points of the passenger compartment in accordance with the needs of the passengers. These ducts discharge directly into adequate vents of the dashboard to ensure the comfort of the front passengers and at the bottom of the windshield to ensure defrosting thereof, or are prolonged to the rear of the vehicle, generally hidden among the interior furnishing elements such as the central bracket or the door sill moldings.

A problem arises when considerations of roominess and esthetics dictate that these ducts must not encroach on the habitable interior space.

A first type of solution comprises constructing devices which are provided with ducts hidden among the structural elements of the vehicle, such as the bottom of the vehicle body or other elements of the substructure.

U.S. Pat. No. 2,696,774 describes such an arrangement.

In this case, the air is first drawn at the front of the vehicle then conveyed partly to an air conditioner via tubular cavities comprising part of the vehicle structure. Other zones of these same tubular cavities allow the heated or cooled air to be conveyed to the places of the rear passengers.

This solution is not satisfactory, however, because the temperature variations associated with heat exchanges between the walls of structural elements and the outside atmosphere greatly reduce the efficiency of the installation.

Another type of solution is introduced by the devices for which air originating from the distributor is conveyed in inlaid ducts of rectangular cross section and small thickness hidden among the trim of the floorboard of the vehicle.

European Patent EP A 0210548 describes such a device.

This device considerably reduces the exchanges of heat with the outside atmosphere, but it can be applied only to mid-sized vehicles, because long ducts cannot be applied to a vehicle of the monospace type having both great length and large inside volume, since the pressure losses in the ducts are too large.

In the monospace case it is possible to adopt an architecture of the device for ventilating, heating and air-conditioning the passenger compartment that uses the cavities of the vehicle structure to convey air to the front passengers, to the rear passengers and to the windows, thus making it possible to consider an intermediate longitudinal position for the device. The outlets of the distributor of the device can therefore be connected to different cavities of the vehicle structure to which the distributor is attached.

European Patent EP B1 0503987 describes such a device.

This device solves the problem of pressure losses, but it still suffers from exchanges of heat with the outside atmosphere. To overcome this, it is necessary to overdimension the exchangers and the fan, leading to a considerable disadvantage for a device which is supposed instead to occupy a minimum space on one of the sides of the vehicle, so that it can be housed in an intermediate longitudinal position, for example in a housing close to one of the vehicle posts, without encroaching on the habitable interior space.

SUMMARY OF THE INVENTION

To overcome these disadvantages, the invention proposes a device of the type described hereinabove, characterized in that the distributor is arranged transversely in central position and longitudinally behind a row of seats, and in that the outlets of the distributor are disposed in the floor structure of the vehicle.

According to other characteristics of the invention:

the distributor is provided with a case, in an upper face of which there are disposed the outlets, to which there are connected the different ducts for delivery of air into the passenger compartment of the vehicle;

the case of the distributor is part of a unit, which is provided with a heat exchanger for heating and a heat exchanger for cooling;

the unit is provided with means which ensure that different mixtures of the air stream can be achieved and channeled to the distributor, to be blown simultaneously and independently through the different outlets of the distributor;

the unit is provided with the main fan, one inlet of which permits intake of the air and one interior outlet on the unit forces an air stream through a heating exchanger and/or a cooling exchanger;

the intake conduits and the air delivery ducts are fixed on the inside walls of the passenger compartment of the vehicle and/or are integrated into the interior trim elements of the vehicle, especially the floor carpets and the interior furnishing elements;

the air intake conduit is provided with a vertical segment which is connected to an outside air intake orifice disposed under the windshield of the vehicle, and a horizontal segment equipped with inside air intake orifices, which segment extends longitudinally close to the longitudinal central axis of the vehicle and is connected to the fan inlet;

the air delivery ducts are provided with two ducts, right and left respectively, for distributing air to the legs of the front passengers, which ducts are provided successively with horizontal segments extending longitudinally between the distributor and the vehicle dashboard, on the respective two sides of the central longitudinal axis of the vehicle, and which discharge into two vents, right and left respectively, for delivery of air to the legs of the front passengers, which vents are oriented vertically downward at right angles to the feet of the passengers;

the air delivery ducts are provided with at least one central duct, which delivers air to the legs of the rear passengers and is oriented along the central longitudinal axis of the vehicle;

the air delivery ducts are provided with two ducts, right and left respectively, for lateral and upward distribution of air, which ducts are provided successively with two opposite horizontal segments extending transversely, two segments extending vertically along the side posts of the passenger compartment of the vehicle and provided with right and left side vents disposed along the side posts, and two segments extending longitudinally along the sides of the roof of the vehicle and provided with side vents disposed on the sides of the roof of the vehicle;

the air delivery ducts are provided with two horizontal ducts, right and left respectively, for distribution of air toward the front, which ducts are provided with segments extending longitudinally between the distributor and the vehicle dashboard while following the central axis of the vehicle, and which are connected in the lower zone of the dashboard to a device for front air distribution;

the front air distribution device is actuated by means for actuating the ventilating, heating and air-conditioning device, and it is provided with at least one shutter which distributes the air between a single defrosting duct, with which there is associated an auxiliary electric fan to force a stream of air through an electric defrosting radiator toward defrosting vents disposed along the windshield of the vehicle, and between two independent transverse ducts, right and left respectively, for ventilation for the front passengers, each of which transverse ducts discharges into two blower vents situated at mid-height of the dashboard on each side of the right and left front passengers.

BRIEF DESCRIPTION OF THE DRAWINGS

Other characteristics and advantages of the invention will become apparent upon reading the detailed description hereinafter, which will be understood by referring to the attached drawings, wherein.

DESCRIPTION OF THE PREFERRED EMBODIMENTS

Figure 1:
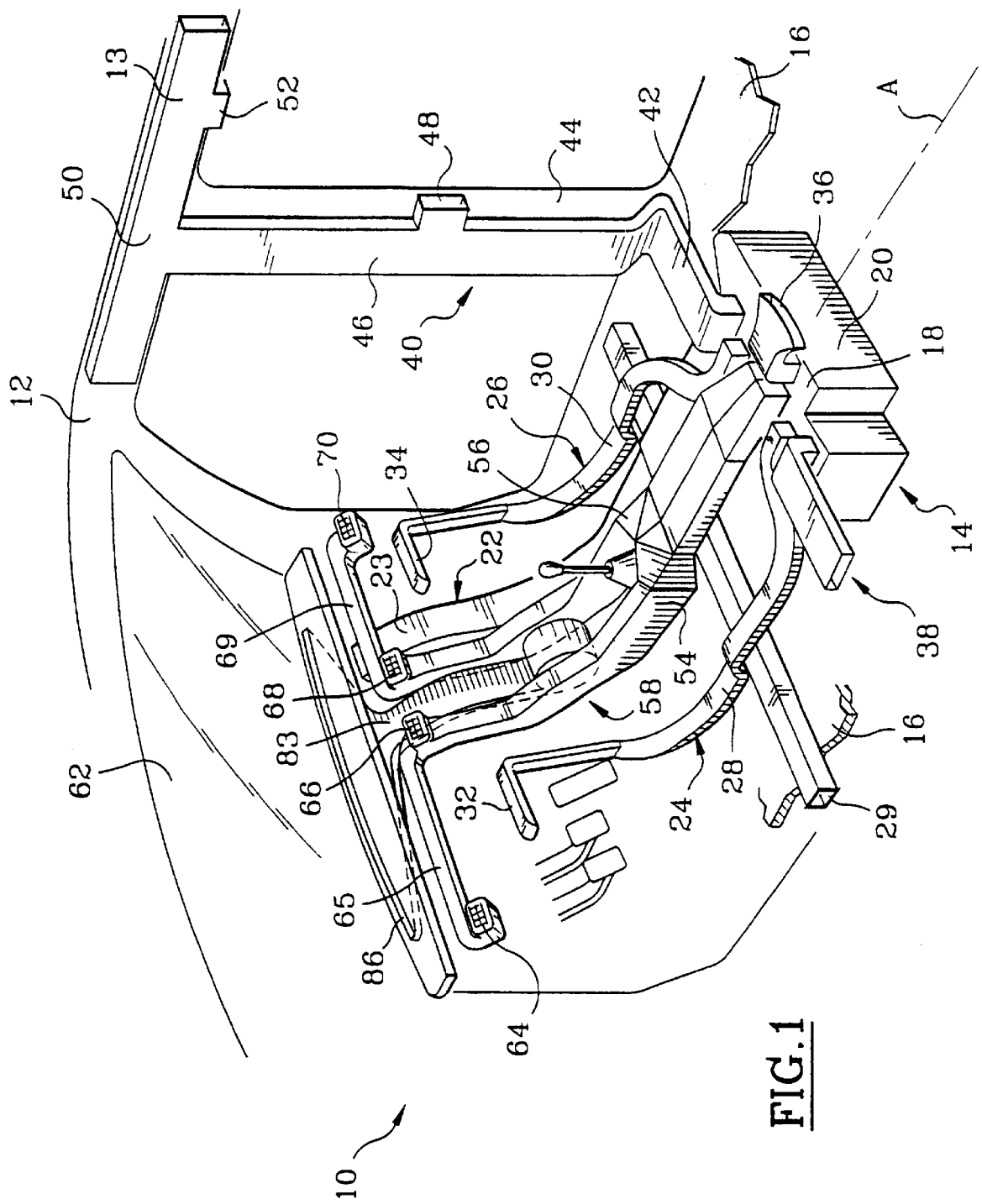
FIG. 1 is a schematic perspective view of a part of the passenger compartment of a vehicle equipped with a device constructed according to the invention, as seen by an observer situated at the left rear of the vehicle and showing the position of the different elements of the device in the passenger compartment of the vehicle.

FIG. 1 shows the entirety of a device 10 for ventilation, heating and air-conditioning constructed according to the invention. Device 10 is installed in passenger compartment 12 of a motor vehicle of the monospace type.

According to the invention, a ventilating, heating and air-conditioning unit 14 is arranged transversely in central position and longitudinally behind a row of seats (not shown) in a floor structure 16 comprising part of passenger compartment 12 of the motor vehicle. An upper face 18 of a distributor 20 comprising part of ventilating, heating and air-conditioning unit 14 is disposed in floor structure 16 of the vehicle and is connected by different outlets (not shown) to the different air delivery ducts of the passenger compartment. In addition, ventilating, heating and air-conditioning unit 14 is supplied with air by means of an intake conduit 22, which is disposed longitudinally to the right of a longitudinal central axis A of the vehicle, according to the views of FIGS. 1 and 2.

According to the invention, air intake conduit 22 is provided with an outside air intake orifice (not shown) and at least one inside air intake orifice (not shown). These inside and outside air intake orifices allow ventilating, heating and air-conditioning unit 14 to be supplied selectively by means of air intake conduit 22.

The option given to the passengers of selective choice between two air intake sources is particularly advantageous to the extent that, since the vehicle may be forced to travel in zones of poor air quality, the plurality of air intake sources makes it possible to supply ventilating, heating and air-conditioning device 10 either with air from outside the vehicle, filtered through different particulate and odor filters, for example, or to recycle all or part of the inside air, and in all circumstances to maintain inside passenger compartment 12 of the vehicle an air quality level sufficient for the comfort of the passengers.

According to the invention, the different air delivery ducts make it possible to blow different air streams at different temperatures to different points of passenger compartment 12.

Starting from central distributor 20, two ducts 24 and 26, left and right respectively, for distribution of air to the legs of the front passengers extend in a substantially longitudinal direction of the vehicle. The left and right ducts 24 and 26 respectively for distribution of air to the legs of the front passengers are provided with horizontal segments 28 and 30 respectively, which extend longitudinally toward the front of the vehicle while conforming to the shapes of floor structure 16 of the vehicle and in particular of a crossbeam 29, which is designed to ensure rigidity of floor structure 16 of the vehicle and on which there can be fixed the seats of the front row. They are provided with two crooked members 32 and 34, left and right respectively, which blow warm air toward the feet of the passengers. In fact, it is known that optimal comfort conditions are achieved when warm air is blown into the lower zones of the vehicle while fresher air is blown into the upper zones of the vehicle.

The left and right crooked members 32 and 34 respectively of left and right ducts 24 and 26 respectively for distribution of air to the front passengers make it possible on the one hand to satisfy this criterion by directing the air stream downward toward the legs of the front passengers. In analogous manner, a central duct 36 for delivery of air to the legs of the rear passengers, visible in the views of FIGS. 1 and 2, oriented along central longitudinal axis A of the vehicle, ensures that these criteria of comfort are met and that warm air is distributed homogeneously in the lower zones of the vehicle situated behind the front places.

Central duct 36 for delivery of air to the legs of the rear passengers is directly disposed on upper face 18 of ventilation, heating and air-conditioning unit 14, and so it does not encroach on the part of the floor structure between unit 14 and the rear of the vehicle, which is reserved, for example, for slideways for adjustable fixation of the vehicle seats.

The blowing of air streams substantially fresher than those blown by ducts 24, 26 and 36 is ensured in two main zones.

On the one hand, two ducts 38 and 40, left and right respectively, for lateral and upward distribution of air make it possible to blow fresh air streams into the lateral and upper parts of the vehicle. Duct 38, of which FIG. 1 illustrates only the connection to upper face 18 of distributor 20, is symmetric with right duct 40 relative to the central longitudinal plane of the vehicle.

Figure 2:
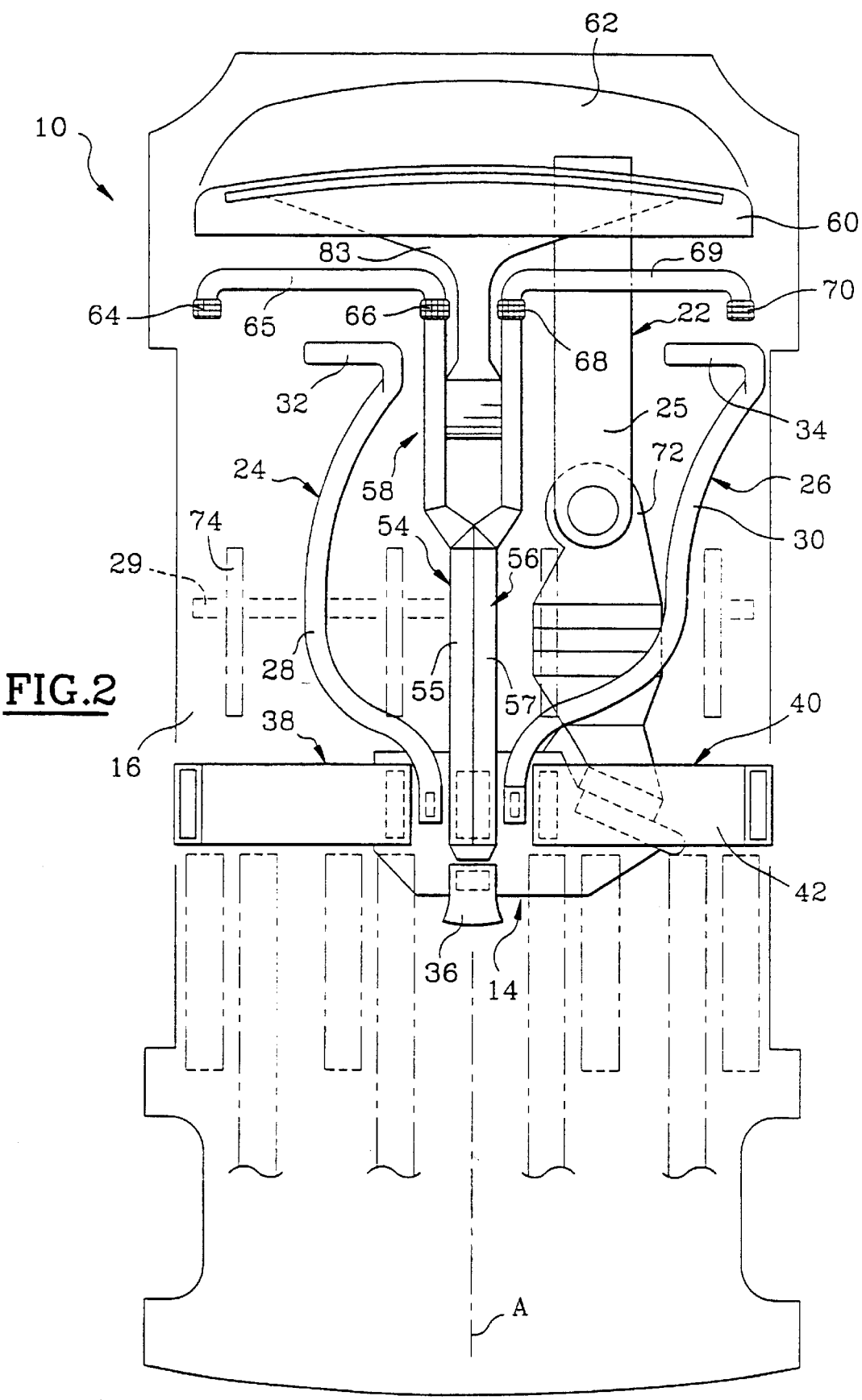
FIG. 2 is a schematic overhead view showing the position, in the passenger compartment of the vehicle, of the device constructed according to the invention.

Right duct 40 for lateral and upward air distribution is provided with a first horizontal segment 42, visible in FIGS. 1 and 2, which extends transversely on both sides of unit 14 as far as the base of a lateral post 44, visible in FIG. 1, of passenger compartment 12. A second segment 46 of duct 40 ascends laterally along post 44 and is provided with at least one lateral vent 48 which permits in particular ventilation of the rear passengers and/or blowing air to the side windows of the vehicle (not shown).

Vertical lateral segment 46 of right duct 40 for lateral and upward air distribution is terminated at its top end in a segment 50 which extends longitudinally along right side 13 of the roof (not shown) of the vehicle, and which is provided with at least one lateral vent 52 directed vertically downward to ensure that fresh air is blown toward the passengers and/or the side windows of the vehicle.

As illustrated in FIG. 1, segment 50 of side 13 of the roof can extend to the front and rear of the vehicle over the entire length of the roof, to ensure homogeneous blowing of fresh air in the upper part over the entire length of passenger compartment 12 of the vehicle.

On the other hand, as is evident in FIGS. 1 and 2, device 10 for ventilating, heating and air-conditioning 10 is provided with two horizontal ducts 54 and 56, left and right respectively, which extend longitudinally from upper face 18 of distributor 20 toward the front of the vehicle, to terminate at a front air distribution device 58, and which contribute to the blowing of substantially fresh air in the interior of passenger compartment 12 of the vehicle.

Front air distribution device 58 makes it possible to channel the air stream originating from left and right horizontal ducts 54 and 56 respectively between, on the one hand, a plate 60 for defrosting a windshield 62 of the vehicle and, on the other hand, independent left and right blowers 64, 66 and 68, 70 respectively available to the front passengers of the vehicle.

The passengers can choose to favor selectively the blowing of air via plate 60 or via blowers 64, 66, 68, 70, by adjusting air distribution device 58 as will be explained hereinafter with reference to FIGS. 3, 4 and 5. Air distribution device 58 is particularly advantageous, because it permits using the air streams circulating in left and right ducts 54 and 56 respectively and coming from distributor 20, thus ensuring functions of blowing air and defrosting simultaneously or independently.

The view of FIG. 2 illustrates in particular the layout on floor structure 16 of the different elements of ventilating, heating and air-conditioning device 10.

The fact that distributor 20 occupies a central transverse position which in longitudinal direction is behind the front row of seats ensures that the lengths of ducts and conduits connected thereto can be made uniform. In this connection, the dimensioning of fan 72 can be matched exactly to the stream to be supplied, since the pressure losses are substantially the same in the different ducts, which have substantially the same length.

In addition, left and right ducts 24 and 26 respectively for distribution of air to the legs of the front passengers are disposed at such a transverse distance from central axis A of the vehicle that they pass between slideways 74 of the front seats of the vehicle. The same is true for left and right ducts 38 and 40 respectively for lateral and upward distribution of air, which ducts are disposed transversely between the slideways of the front seats and the slideways of the first row of rear seats of the vehicle, for example in a thickness of a floorboard covering (not shown).

Finally, it will be noted that air intake conduit 22, which is disposed to the right of central axis A of the vehicle, can advantageously function as footrest for the right front passenger or for the driver if the vehicle is destined for a country with driving on the left, and in this context can be integrated into the interior furnishings of the vehicle.

Figure 3:
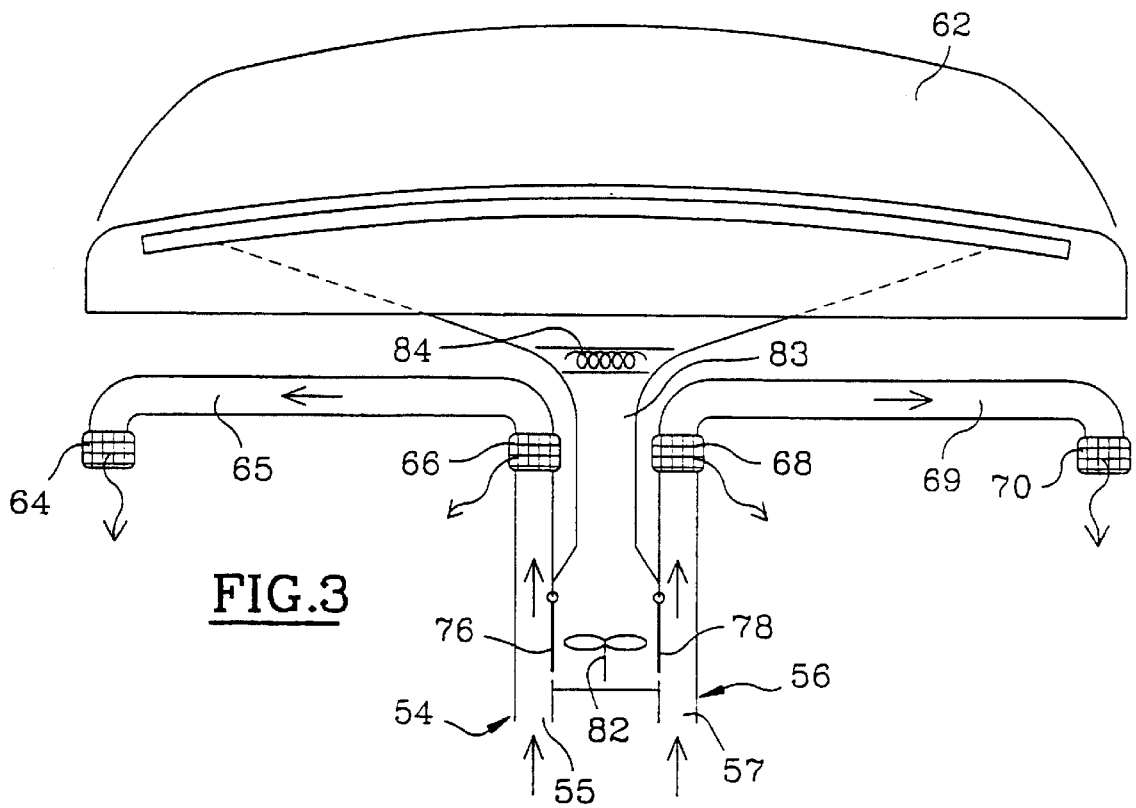
FIG. 3 is a view of a detail of FIG. 2 showing the front air distribution device in a mode of operation in which it blows air to the front places.

FIG. 3 illustrates the operation of front air distribution device 58 according to a first mode of blowing air to the front passengers.

The fresh air stream is conveyed to front air distribution device through left and right front air distribution ducts 54 and 56 respectively. In this configuration, as the arrows show, the air streams are preferentially oriented toward the front passengers, independently for each passenger. Consequently, each duct for distribution of air to the front can blow an air stream at a temperature substantially different from that of the air stream conveyed by the other duct. The ventilation air streams are blown by the two series 64, 66 and 68, 70 respectively of blowers for the front passengers. This makes it possible to blow to the right and left front passengers air streams at different temperatures, to the liking of each passenger. To achieve this, device 58 is provided with left and right shutters 76 and 78 respectively, which guide each air stream along a case 80, which in this figure is closed and which contains a fan 82, which in this figure is turned off.

Figure 4:
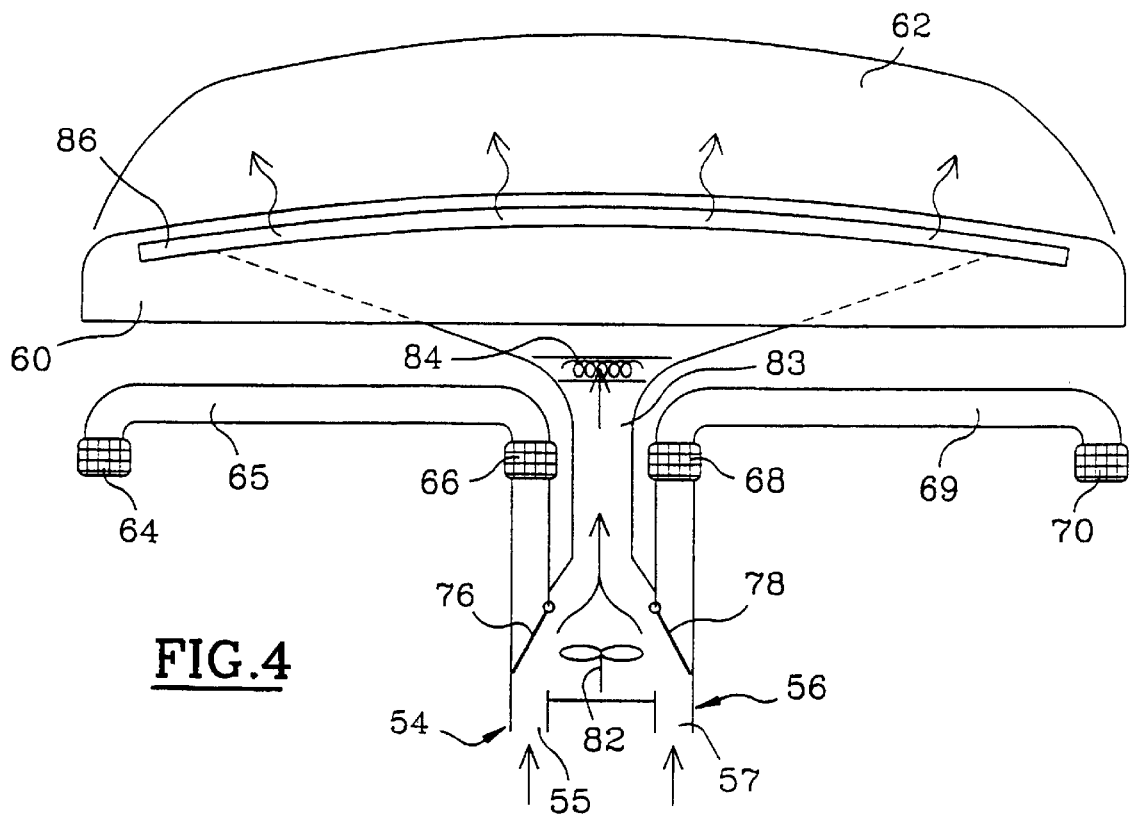
FIG. 4 is a view of a detail of FIG. 2 showing the front air distribution device in a mode of operating in which it defrosts the windshield.

In FIG. 4, front air distribution device 58 is actuated by the passengers for the purpose of ensuring defrosting of front windshield 62. In this configuration left and right shutters 76 and 78 respectively are open, thus diverting the air streams originating from distributor 20 and conveyed by front air distribution ducts 54 and 56 respectively, while mixing them in a duct 83 by means of an additional fan 82, now turned on, which forces the stream thus obtained through an additional radiator 84 to heat the front air stream and urge it toward a series of vents 86 belonging to defrosting plate 60.

In this configuration, the streams originating from left and right ducts 54 and 56 respectively are mixed in order to obtain a homogeneous mixture, which can be blown over the entire width of windshield 62 in order to defrost it rapidly. It is in fact known that the effectiveness of windshield defrosting depends on both the temperature and velocity of the air blown to its surface. In this context, front air distribution device 58 permits rapid defrosting by accelerating the air by means of fan 82 and by heating it by means of radiator 84, which can be designed, for example, as a radiator based on ceramic material.

Figure 5:
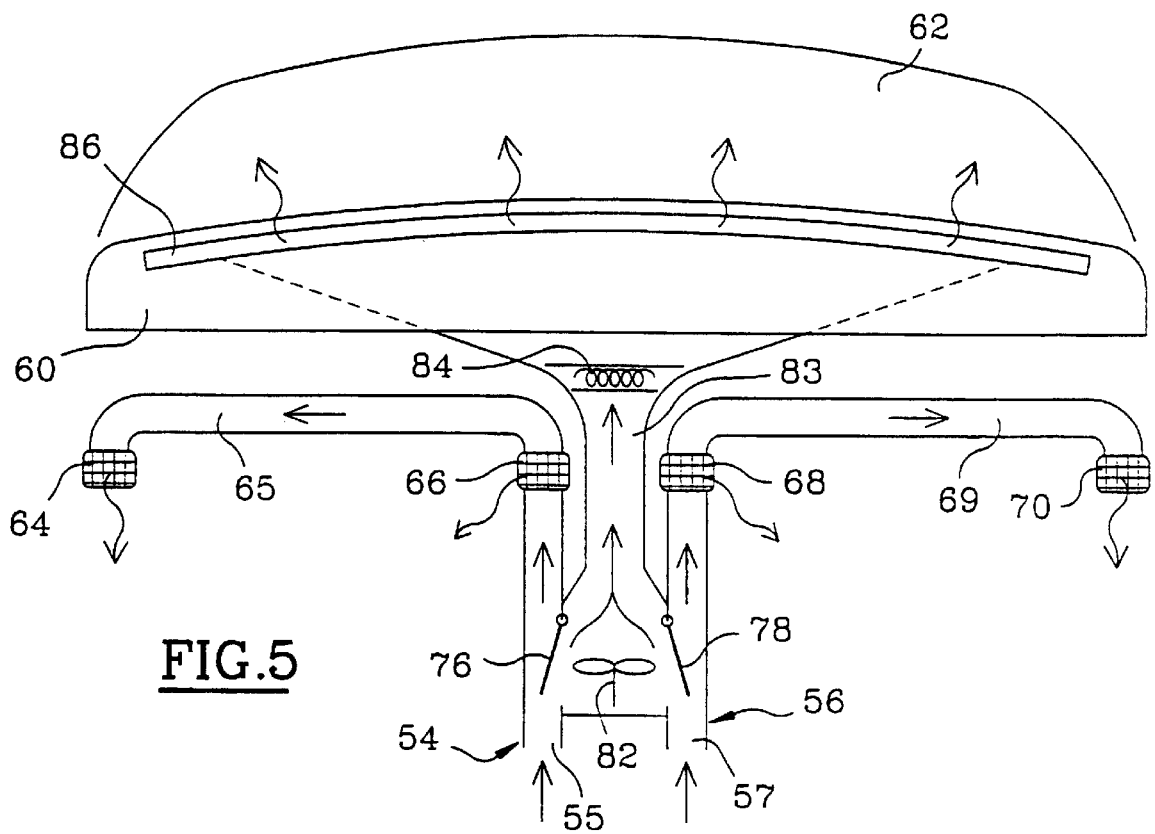
FIG. 5 is a view of a detail of FIG. 2 showing the front air distribution device in a mixed mode of operation in which it defrosts the windshield and blows air to the front places.

In the case illustrated in FIG. 5, in which the passengers wish to benefit from air blown to the front places and in which defrosting of windshield 62 is necessary, device 58 can perform only partial mixing of the air streams originating from left and right ducts 54 and 56 respectively for defrosting purposes. In fact, in this configuration, left and right shutters 76 and 78 respectively of front air distribution device 58 are merely half-open, and only part of each stream is diverted toward defrosting plate 60 and its defrosting vents 86. For each of the left and right front air distribution ducts 54 and 56 respectively, only part of the air stream is mixed with part of the air stream originating from the other duct, while the remaining part is conveyed toward left and right blower vents 64, 66 and 68, 70 respectively, in order to ensure independent temperature comfort for each front passenger, as described hereinabove with reference to FIG. 3.

This configuration is particularly advantageous, because it ensures that defrosting can be achieved at the same time as air is blown to the front passengers, while avoiding an increased number of ducts in the passenger compartment, since the only ducts conveying air from the distributor to the front of the vehicle are left and right front air distribution ducts 54 and 56 respectively, and since this configuration also achieves a large gain in space.

Figure 6:
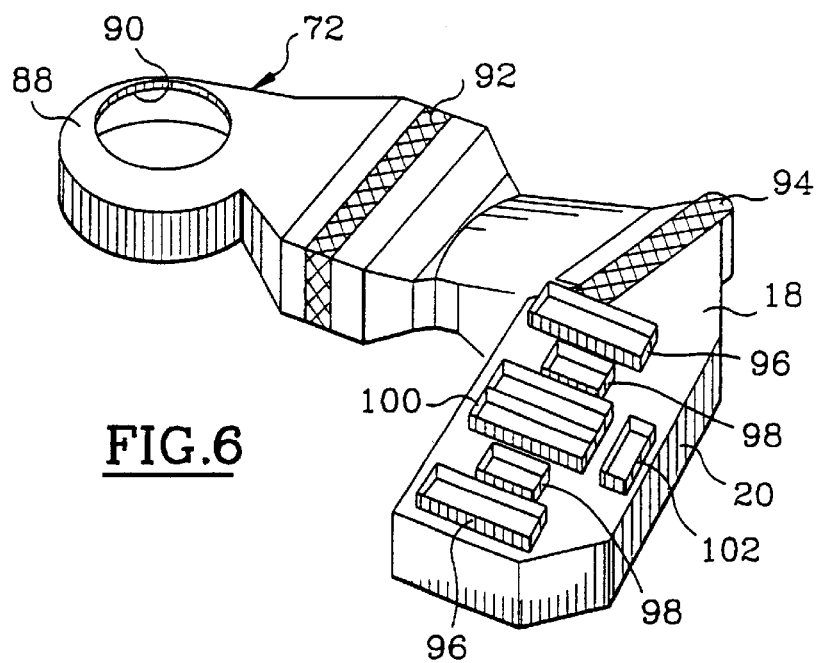
FIG. 6 is a perspective view of the ventilating, heating and air-conditioning unit showing the position of the fan, heat exchangers and distributor, and the arrangement of the outlets thereof.

FIG. 6 illustrates a general view of ventilating, heating and air-conditioning unit 14, showing the positions of the different constitutional elements thereof.

In known manner, unit 14 is provided with main fan 72, and an upper face of case 88 thereof is provided with an orifice 90 which accommodates the end of air intake duct 22. Fan 72 is included in the body and forces an air stream through a heating exchanger 92 or, by means of a shutter device (not shown) inside unit 14, through a cooling exchanger 94, such that different air streams at different temperatures can be obtained at the outlets of upper vents 96, 98, 100 and 102 formed in upper face 18 of distributor 20, which vents represent the outlets thereof.

Outlets 96 are connected to lateral and upward air distribution ducts 38 and 40, outlets 98 are connected to ducts 24 and 26 for distribution of air to the legs of the front passengers, outlets 100 are connected to front air distribution ducts 54 and 56, and outlet 102 is connected to central duct 36 for delivery of air to the legs of the rear passengers, as described hereinabove with reference to FIG. 1.

Such a ventilating, heating and air-conditioning unit 14 is particularly advantageous, because it makes it possible in a relatively confined space to group all the components for production of air streams at desired flowrates and temperatures, and consequently to simplify the installation of unit 14 during assembly of the vehicle, thus achieving particular advantages in terms of manufacturing costs.

What is claimed is:

1. A device for ventilating, heating and air conditioning a passenger compartment of a motor vehicle, provided with inside and outside air intake orifices for the passenger compartment of the vehicle and at least one air intake conduit associated with the orifices, which conduit supplies at least one main fan, which forces an intake air stream through at least one heat exchanger toward a distributor, whose outlets are connected by ducts to associated vents, distributed throughout the passenger compartment, for delivery of air, at least one of the ducts having at least one shutter provided within an airflow path of the at least one of the ducts and configured to divert an air stream from the distributor, and provided with means for housing the main fan, exchanger and distributor, which means being configured to deliver air streams of variable flowrate and temperature selectively into zones of the passenger compartment, wherein the distributor is arranged transversely in central position and longitudinally behind a row of seats, and the outlets of the distributor are disposed in a floor structure of the vehicle.

2. A device for ventilating, heating and air-conditioning according to claim 1, wherein the case of the distributor is part of a unit, which is provided with a heat exchanger for heating and a heat exchanger for cooling.

3. A device for ventilating, heating and air-conditioning according to claim 2, wherein the unit is provided with means for ensuring that different mixtures of the air stream can be achieved and channeled to the distributor, to be blown simultaneously and independently through the different outlets of the distributor.

4. A device for ventilating, heating and air-conditioning according to claim 2, wherein the unit is provided with the main fan, one inlet of which permits intake of the air and one interior outlet on the unit forces an air stream through at least one of a heating exchanger and a cooling exchanger.

5. A device for ventilating, heating and air-conditioning according to claim 1, wherein the air intake conduit is provided with a vertical segment which is connected to an outside air intake orifice disposed under a windshield of the vehicle, and a horizontal segment equipped with inside air intake orifices, which segment extends longitudinally close to a longitudinal central axis A of the vehicle and is connected to the inlet of the fan.

6. A device for ventilating, heating and air-conditioning according to claim 1, wherein the air delivery ducts are provided with two ducts, right and left respectively, for distributing air to legs of front passengers, which ducts are provided successively with right and left horizontal segments extending longitudinally between the distributor and a vehicle dashboard, on respective two sides of a central longitudinal axis A of the vehicle, and which discharge into two vents, right and left respectively, for delivery of air to the legs of the front passengers, which vents are oriented vertically downward at right angles to feet of the passengers.

7. A device for ventilating, heating and air-conditioning according to claim 1, wherein the air delivery ducts are provided with at least one central duct, which delivers air to legs of rear passengers and is oriented along a central longitudinal axis A of the vehicle.

8. A device for ventilating, heating and air-conditioning according to claim 1, wherein the air delivery ducts are provided with two ducts, right and left respectively, for lateral and upward distribution of air, which ducts are provided successively with two opposite horizontal segments extending transversely, two segments extending vertically alongside posts of the passenger compartment of the vehicle and provided with right and left side vents disposed along the side posts, and two segments extending longitudinally along sides of a roof of the vehicle and provided with side vents disposed on the sides of the roof of the vehicle.

9. A device for ventilating, heating and air-conditioning according to claim 1, wherein the air delivery ducts are provided with two horizontal ducts, right and left respectively, for distribution of air toward a front, which ducts are provided with respective segments extending longitudinally between the distributor and a vehicle dashboard while following a central longitudinal axis A of the vehicle, and which are connected in a lower zone of the dashboard to a device for front air distribution.

10. A device for ventilating, heating and air-conditioning according to claim 9, wherein the front air distribution device is actuated by means for actuating the ventilating, heating and air-conditioning device, and it is provided with at least one shutter which distributes the air between a single defrosting duct, with which there is associated an auxiliary electric fan to force a stream of air through an electric defrosting radiator toward defrosting vents disposed along a windshield of the vehicle, and between two independent transverse ducts, right and left respectively, for ventilation for front passengers, each of which transverse ducts discharges into blower vents situated at mid-height of the dashboard on each side of right and left front passengers.

11. A device for ventilating, heating and air-conditioning according to claim 1, wherein the distributor includes a case having an upper face, the outlets being disposed on the upper face, the outlets being connected to different ducts for delivery of air into the passenger compartment of the vehicle.

12. A device for ventilating, heating and air-conditioning according to claim 1, wherein the intake conduit and the air delivery ducts are fixed on inside walls of the passenger compartment of the vehicle and are integrated into interior trim elements of the vehicle.

13. A device for ventilating, heating and air conditioning a passenger compartment of a motor vehicle, said device comprising:

an intake air conduit;

a heat exchanger;

a distributor having outlets connected by air delivery ducts to associated vents distributed in the passenger compartment, at least one of the air delivery ducts having at least one shutter provided within an airflow path of the at least one of the air delivery ducts and configured to divert an air stream from the distributor;

a main fan configured to force an intake air stream through said intake air conduit and through said heat exchanger, and provide the intake air stream to said distributor; and means for housing said main fan, said exchanger and said distributor such that air is selectively provided to said vents at a variable flowrate and temperature into predetermined zones of the passenger compartment, wherein said distributor is arranged on the vehicle transversely in a central position and longitudinally behind a row of seats, and wherein said outlets of said distributor are disposed in a floor structure of the vehicle.

14. A device for ventilating, heating and air-conditioning according to claim 13, wherein said distributor includes a case having an upper face, said outlets being disposed on said upper face.

15. A device for ventilating, heating and air-conditioning according to claim 13, wherein said intake conduit and said air delivery ducts are fixed on inside walls of the passenger compartment of the vehicle and are integrated into interior trim elements of the vehicle.

* * * * *